F. W. MARRIOTT.
Seed Planter.
No. 78,303.             Patented May 26, 1868.
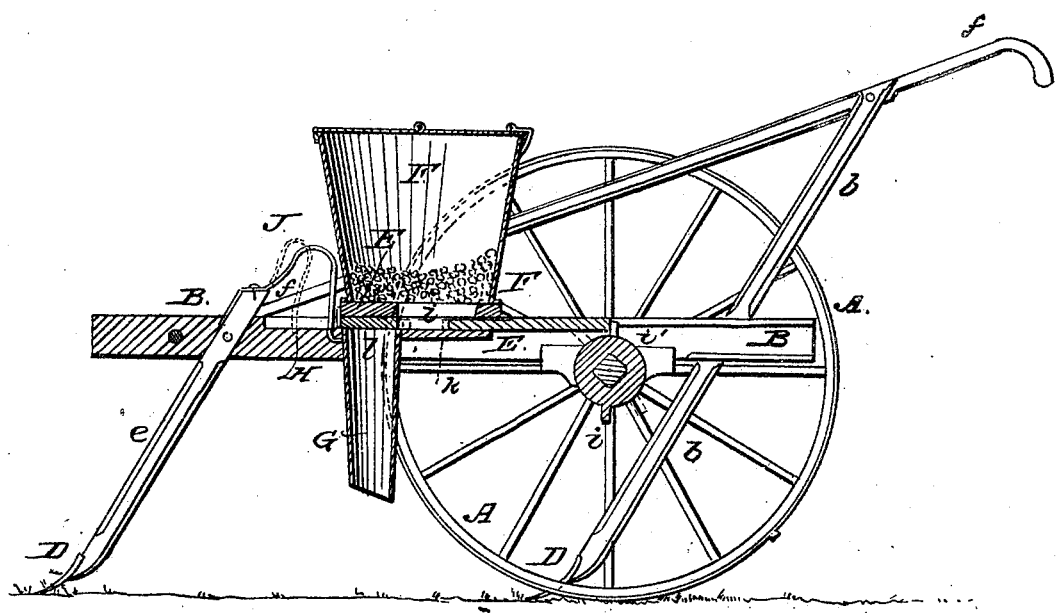
Witnesses
C. Fahnestock
E. H. Ashurst(?)
Inventor.
Franklin W. Marriott
by his atty
S. S. Fahnestock

United States Patent Office.

FRANKLIN W. MARRIOTT, OF RICHWOOD, OHIO.

Letters Patent No. 78,303, dated May 26, 1868.

IMPROVEMENT IN CORN AND SEED-PLANTERS.

*The Schedule referred to in these Letters Patent and making part of the same.*

TO ALL WHOM IT MAY CONCERN:

Be it known that I, FRANKLIN W. MARRIOTT, of the town of Richwood, and county of Union, in the State of Ohio, have invented a new and improved Machine for Planting Corn or other Seeds; and I do hereby declare that the following is a full and exact description thereof, reference being had to the accompanying drawings, and to the letters of reference marked thereon.

The nature of my invention consists in so constructing a machine, to be hereafter described, as to be able to "furrow out" the ground, drop the seed at any desired intervals, and in any quantities, as also cover the same, all by one operation, combining simplicity of construction, economy, and reliability.

To enable others skilled in the art to make and use my invention, I will proceed to describe its construction and operation.

In the drawings—

Figure 1 represents a longitudinal and vertical section of my seeder,

A being the wheels, B the frame, secured in any suitable manner to axle C. This frame, B, supporting receptacle or hopper F, is made of two pieces joined together in front, and spreading out toward the rear. Attached to this frame B are the handles f, coming in contact with it in front, just behind a piece, e, projecting downward, but this attachment may be varied without changing the nature of my invention. These handles f are secured to rear part of frame B by being secured to diagonal pieces b projecting downward; these, as well as e, carrying each a shovel-plough, D.

The pieces b are directly secured to pieces B, and through them f f are secured to the same. F is a receptacle or hopper for the seed, being secured to a cross-piece, E, attached to pieces B B. This piece, E, forms the bottom of the hopper F, and a dropping-spout, G, is attached to its lower side.

Passing longitudinally through E is a sliding piece, H, having a hole, I, through it, intended to hold the desired quantity of seed to be dropped each time.

Until the piece H is pushed forward, the seed in this hole are retained, as the lower part of E constitutes a bottom, as seen at K. The upper part of E is cut out at i, to let the seed into the hole in sliding piece H.

To the front end of H is attached a spring, j, which is fastened in front to piece e, or it can be fastened to any other part of the framework. Where spout G is attached to lower side of E, there is a hole, l, extending up underneath H, covered, however, above H by piece E.

The wheels A are secured to the axle C, which carries a cam or wheel, I, having two projections i'. The number of these projections can be varied at pleasure, depending upon the distance apart each charge of seed is to be dropped. On the wheels A, it will be seen, there are also projections s. The wheels serve to regulate the distance apart of the rows, whilst these projections, two, more or less, will designate where the seed is to be dropped.

The beams or pieces b, attached to handles f, and frame-pieces B are not necessarily permanently attached to these latter, but can be made adjustable, so that these pieces, with their ploughs, can be raised or lowered at pleasure, particularly the former, in going to or returning from the field.

The operation is as follows: Having attached the draught-animals to the front of my machine, the front plough, D, at bottom of piece e, makes a furrow, and at certain intervals, the cam or toothed wheel i, on the axle C, coming in contact with sliding or reciprocating piece H, pushes it forward, so that the hole in it, containing the charge of seed, comes over spout G, where the charge is dropped, and falls into the furrow made by the forward plough. Thus, at certain intervals, regulated at pleasure, by my devices, any quantity of seed can be dropped, and at any desired distances apart. The devices described may be varied without altering the nature of my invention.

Having thus described my invention, what I claim as new, and desire to secure by Letters Patent of the United States, is—

A seed-planter, constructed and operated in the manner substantially as shown and described.

FRANKLIN W. MARRIOTT.

Witnesses:
JOEL D. GRAHAM,
GEORGE SMITH.